(12) United States Patent
Park et al.

(10) Patent No.: US 8,910,341 B2
(45) Date of Patent: Dec. 16, 2014

(54) WIPER DEVICE HAVING IMPROVED VIBRATION PREVENTION OF WIPER STRIP

(71) Applicant: Dongyang Mechatronics Corp., Icheon (KR)

(72) Inventors: Wi Yeong Park, Incheon (KR); Jong Wook Lee, Incheon (KR); Sung Jun Yoon, Incheon (KR)

(73) Assignee: Dongyang Mechatronics Corp., Incheon (KR)

( * ) Notice: Subject to any disclaimer, the term of this patent is extended or adjusted under 35 U.S.C. 154(b) by 36 days.

(21) Appl. No.: 13/826,721

(22) Filed: Mar. 14, 2013

(65) Prior Publication Data

US 2013/0333149 A1    Dec. 19, 2013

(30) Foreign Application Priority Data

Jun. 18, 2012    (KR) .................. 10-2012-0065240

(51) Int. Cl.
*B60S 1/38*    (2006.01)
*B60S 1/34*    (2006.01)

(52) U.S. Cl.
CPC ............. *B60S 1/34* (2013.01); *B60S 1/3801* (2013.01); *B60S 2001/3815* (2013.01)
USPC .................................... 15/250.46; 15/250.44

(58) Field of Classification Search
CPC ............ B60S 1/38; B60S 1/3801; B60S 1/34; B60S 2001/3815
USPC ............ 15/250.46, 250.43, 250.44, 250.361, 15/250.31
See application file for complete search history.

(56) References Cited

U.S. PATENT DOCUMENTS

| 2,807,821 A | 10/1957 | Scinta |
| 3,003,175 A | 10/1961 | Krohm |

(Continued)

FOREIGN PATENT DOCUMENTS

| DE | 2 151 020 | 4/1972 |
| DE | 2 128 678 | 12/1972 |

(Continued)

OTHER PUBLICATIONS

Non-Final Rejection issued by Korean Patent Office for priority Korean application 10-2012-0065240 dated Jul. 24, 2012 with English translation.

(Continued)

*Primary Examiner* — Gary Graham
(74) *Attorney, Agent, or Firm* — Frommer Lawrence & Haug LLP; Ronald R. Santucci

(57) ABSTRACT

A wiper device including: a yoke for supporting a wiper strip; an auxiliary lever including a coupling protrusion coupled to a coupling hole prepared in the yoke and formed of synthetic resin; and a main lever including an assembly protrusion coupled to an assembly hole prepared in the auxiliary lever and formed of the synthetic resin, wherein the auxiliary lever includes: a first vibration prevention portion protrusively formed to contact an upper surface of the yoke on a cross section taken along a width direction of the auxiliary lever in a position where the coupling hole is disposed; and a second vibration prevention portion in which an outer circumference surface of the coupling protrusion is formed in a tapered form so that the coupling protrusion coupled to the coupling hole is fit in a direction in which the coupling protrusion is coupled to the coupling hole.

2 Claims, 5 Drawing Sheets

(56) References Cited

U.S. PATENT DOCUMENTS

| | | | |
|---|---|---|---|
| 3,733,643 A | | 5/1973 | Arman |
| 3,879,792 A | | 4/1975 | Brummer et al. |
| 4,675,934 A | * | 6/1987 | Dal Palu .................. 15/250.46 |
| 5,465,454 A | | 11/1995 | Chang |
| 5,666,687 A | | 9/1997 | Charng |
| 8,661,602 B2 | * | 3/2014 | Op't Roodt et al. ....... 15/250.46 |
| 2011/0131750 A1 | * | 6/2011 | Kwon et al. ............... 15/250.31 |

FOREIGN PATENT DOCUMENTS

| | | |
|---|---|---|
| DE | 4439276 A1 | 11/1993 |
| DE | 44 39 275 A | 5/1995 |
| EP | 2338747 A2 | 6/2011 |
| GB | 612614 | 11/1948 |
| JP | 08-225063 A | 9/1996 |
| JP | 2003-127840 | 5/2003 |
| KR | 20-0449008 | 6/2010 |
| KR | 10-1028412 B | 4/2011 |

OTHER PUBLICATIONS

Notice of Allowance issued by Korean Patent Office for priority Korean application 10-2012-0065240 dated Oct. 29, 2012 with English translation.

German Office Action dated Feb. 24, 2014 in relation to German Patent Application No. 10 2013 210 499.5 with English translation.

Search Report from German Patent Office for corresponding German Application No. 10 2013 210 499.5 mailed Jan. 13, 2014 with English translation.

* cited by examiner

WIPER DEVICE HAVING IMPROVED VIBRATION PREVENTION OF WIPER STRIP

CROSS-REFERENCE TO RELATED PATENT APPLICATION

This application claims the benefit of Korean Patent Application No. 10-2012-0065240, filed on Jun. 18, 2012, in the Korean Intellectual Property Office, the disclosure of which is incorporated herein in its entirety by reference.

BACKGROUND OF THE INVENTION

1. Field of the Invention

The present invention relates to a wiper device for vehicles, and more particularly, to a wiper device having improved vibration prevention of a wiper strip 2. Description of the Related Art In general, a wiper assembly removes foreign substances present on a front glass or a rear glass of a vehicle by performing repeated reciprocating motions while a motor drives a link device connected to a car body via a wiper arm.

The wiper assembly is a very important component that is essential to safe driving of a vehicle.

In the structure of conventional wipers, a pair of supporting members formed of a metal material is coupled to a wiper strip formed of rubber and is supported by a plurality of yokes, and the plurality of yokes are coupled to each other by a plurality of auxiliary levers.

The conventional wipers use pins or rivets for coupling between the yokes and the auxiliary levers and for coupling between the auxiliary levers so as to rotatably couple the auxiliary levers. Spacers having low coefficient of friction are coupled to coupling portions to reduce friction resistance. Accordingly, about 15 to 20 components are required to form one wiper. In addition, the conventional wipers use a main lever and an auxiliary lever, which are formed of a metal material, and thus are heavy. Such a heavy wiper having many components adds unnecessary load to a wiper arm as well as a window of a vehicle when installed on the vehicle, thereby negatively impacting reliability of the wiper arm. Accordingly, the development of a wiper that is light and has excellent assembly is required.

To solve such a problem, a wiper device that adopts a main lever and an auxiliary lever, which are both formed of synthetic resin, and in which coupling of the levers to one another is due to each lever's own shape has been developed. An example of a wiper device having an improved structure is disclosed in Korean utility model No. 0449008.

A wiper device disclosed in the Korean utility model has an advantage in that each lever is rotatably coupled in a range of a predetermined angle by each lever's own shape, thereby improving the assembily of the wiper device and reducing the weight thereof. However, the wiper device disclosed in the Korean utility model has a problem in which vibration occurs more often at coupling portions during operation of the wiper device in comparison to the conventional wiper devices, thereby deteriorating wiping performance and causing noises. In particular, vibration occurs in a portion in which a yoke for directly supporting a wiper strip is coupled to an auxiliary lever, and thus, the motion of the wiper device is not synchronized with the motion of a wiper arm during wiping operation, thereby deteriorating wiping performance of a windshield and causing noises.

SUMMARY OF THE INVENTION

The present invention provides a wiper device for vehicles, which improves operation performance of the wiper device by preventing vibration of a yoke during operation of the wiper device through the improvement of an assembly structure of the yoke and a lever.

According to an aspect of the present invention, there is provided a wiper device for vehicles, the wiper device including: a yoke for supporting a wiper strip; an auxiliary lever that includes a coupling protrusion coupled to a coupling hole prepared in the yoke and is formed of synthetic resin; and a main lever that includes an assembly protrusion coupled to an assembly hole prepared in the auxiliary lever and is formed of the synthetic resin, wherein the auxiliary lever further includes: a first vibration prevention portion protrusively formed to contact an upper surface of the yoke on a cross section taken along a width direction of the auxiliary lever in a position where the coupling hole is disposed; and a second vibration prevention portion in which an outer circumference surface of the coupling protrusion is formed in a tapered form so that the coupling protrusion coupled to the coupling hole is press fit in a direction in which the coupling protrusion is coupled to the coupling hole, wherein the auxiliary lever is formed on an upper surface of the first vibration prevention portion to reinforce stiffness of the first vibration prevention portion and includes a reinforcing rib extending in a longitudinal direction of the auxiliary lever.

The auxiliary lever may further include: a third vibration prevention portion formed at a contact portion in which one side of the auxiliary lever contacts the main lever, the contact portion being formed on a cross section taken along a width direction of the main lever in a position where the assembly protrusion and the assembly hole are coupled to each other, wherein the third vibration prevention portion is a contact surface formed in the auxiliary lever that is formed in a tapered form so that interference between the auxiliary lever and the main lever occurs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an embodiment of the present invention will be described with reference to accompanying drawings.

Figure 1:
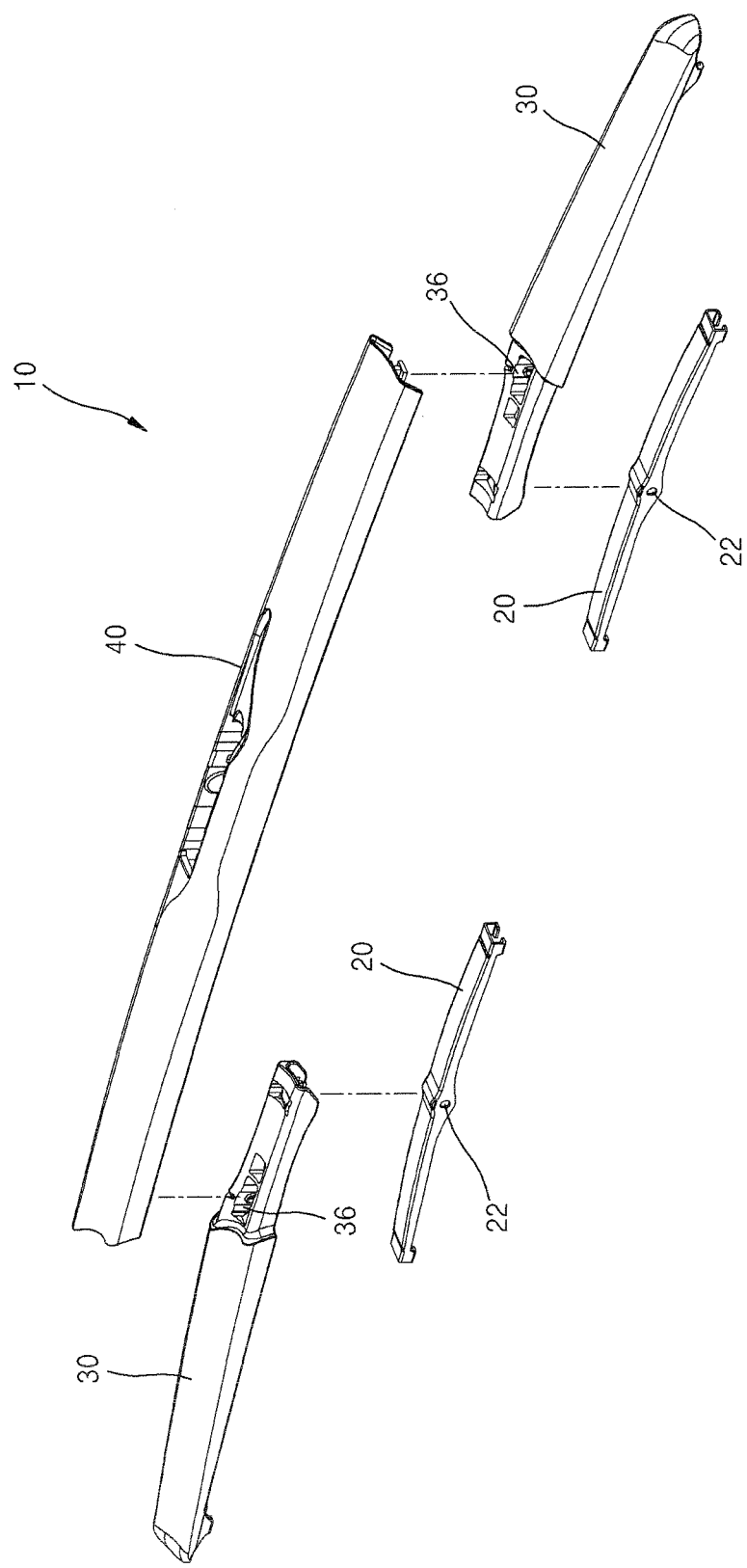
FIG. 1 is a disassembly perspective view of main components constituting a wiper device according to an embodiment of the present invention.
Figure 2:
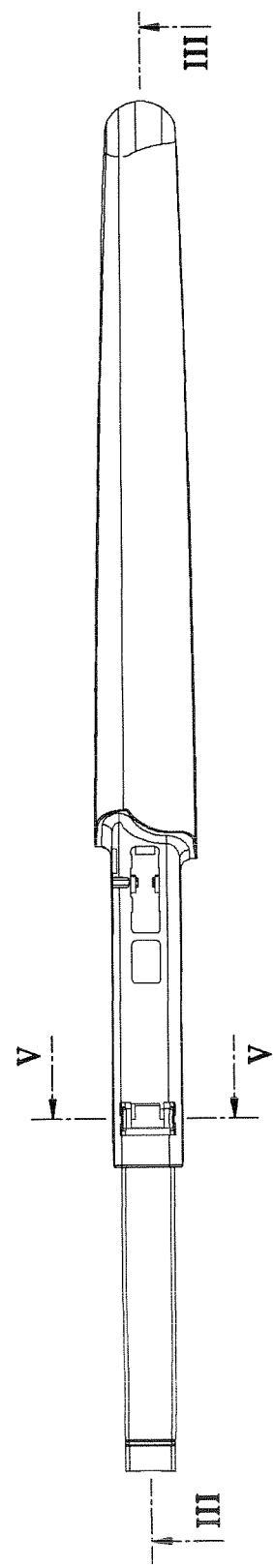
FIG. 2 is a plan view illustrating a state in which a yoke and an auxiliary lever are coupled to each other.
Figure 3:
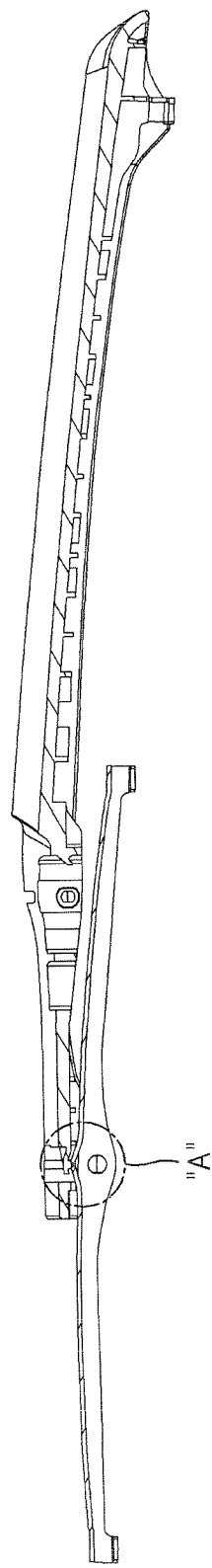
FIG. 3 is a schematic cross-sectional view taken along line III-III illustrated in FIG. 2.
Figure 4:
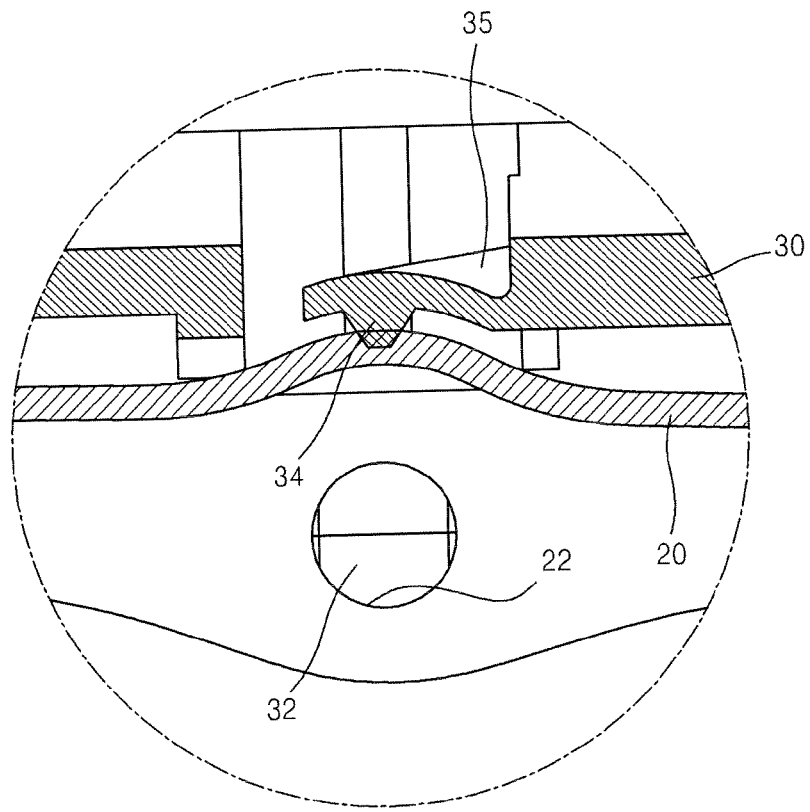
FIG. 4 is a diagram illustrating an enlargement of a portion "A" illustrated in FIG. 3.
Figure 5:
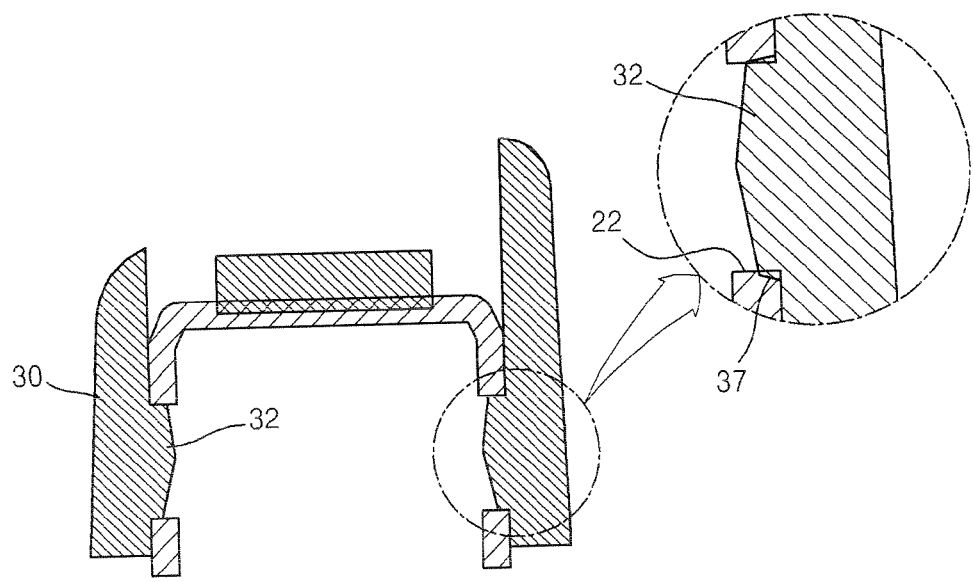
FIG. 5 is a schematic cross-sectional view taken along line V-V illustrated in FIG. 2.
Figure 6:
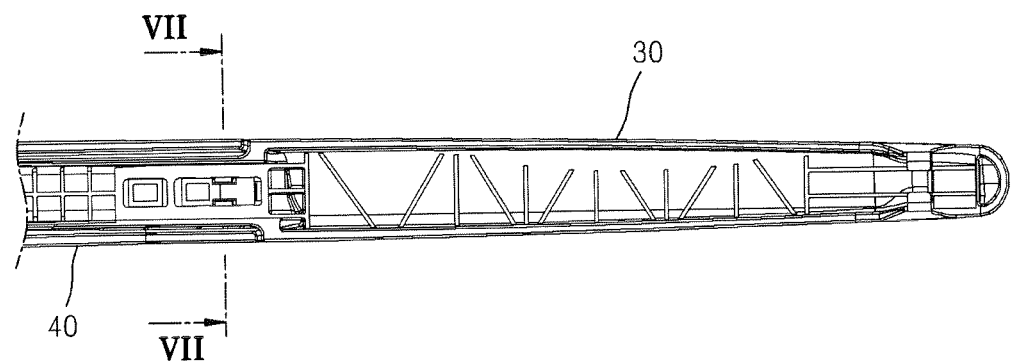
FIG. 6 is a diagram illustrating a state in which a main lever and an auxiliary lever from among components illustrated in FIG. 1 are coupled to each other.
Figure 7:
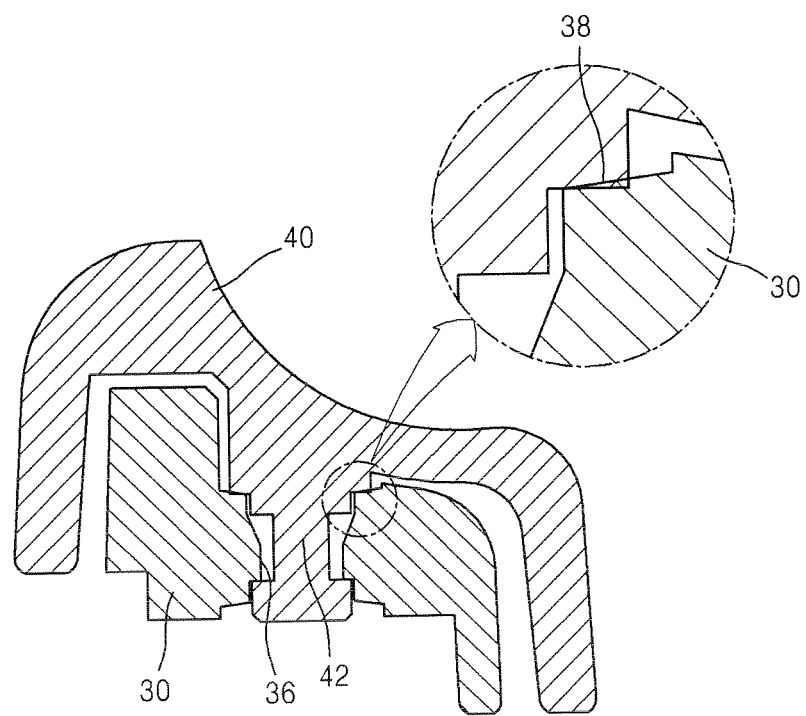
FIG. 7 is a schematic cross-sectional view taken along line VII-VII illustrated in FIG. 6.

FIG. 1 is a disassembly perspective view of main components constituting a wiper device 10 according to an embodiment of the present invention. FIG. 2 is a plan view illustrating a state in which a yoke and an auxiliary lever are coupled to each other. FIG. 3 is a schematic cross-sectional view taken along line III-III illustrated in FIG. 2. FIG. 4 is a diagram illustrating an enlargement of a portion "A" illustrated in FIG. 3. FIG. 5 is a schematic cross-sectional view taken along line V-V illustrated in FIG. 2. FIG. 6 is a diagram illustrating a state in which a main lever and an auxiliary lever from among components illustrated in FIG. 1 are coupled to each other. FIG. 7 is a schematic cross-sectional view taken along line VII-VII illustrated in FIG. 6.

Referring to FIGS. 1 through 7, the wiper device 10 for vehicles, in which vibration prevention performance of a wiper strip is improved, includes a yoke 20, an auxiliary lever 30, and a main lever 40.

The yoke 20 is a member for directly supporting a wiper strip. A plurality of yokes may be disposed. Since a structure and the shape of the yoke 20 are the same as those of the yoke disclosed in the Korean utility model No. 0449008, a detailed description of the structure and shape of the yoke 20 is omitted. However, the yoke 20 includes a coupling hole 22 as a distinguishing structure according to the embodiment of the present invention. The coupling hole 22 is disposed in an intermediate portion of the yoke 20 in the longitudinal direction of the yoke 20. The coupling hole 22 is formed to penetrate a sidewall of the yoke 20 in the width direction of the yoke 20. The coupling hole 22 is formed in the yoke 20. As illustrated in FIG. 4, a cross-sectional shape of the yoke 20 around the coupling hole 22 has a shape in which an upper surface of the yoke 20 protrudes to an upper side of the yoke 20 to become a portion of a circle in the center of the coupling hole 22. A first vibration prevention portion 34 to be described below contacts the upper surface of the yoke 20.

The auxiliary lever 30 includes a coupling protrusion 32. The coupling protrusion 32 is coupled to the coupling hole 22 prepared in the yoke 20. The auxiliary lever 30 is formed of synthetic resin.

The auxiliary lever 30 includes a first vibration prevention portion 34, a second vibration prevention portion 37, and a third vibration prevention portion 38.

The first vibration prevention portion 34 is protrusively formed to contact the upper surface of the yoke 20 on a cross section taken along the width direction of the auxiliary lever 30 in a position where the coupling hole 22 is disposed. A structure of the first vibration prevention portion 34 may be easily understood with reference to FIGS. 4 and 5. That is, the first vibration prevention portion 34 contacts the upper surface of the yoke 20 and is disposed to be slidable on the surface of the yoke 20. In addition, in the auxiliary lever 30, the first vibration prevention portion 34 extends in a cantilever form, as illustrated in FIG. 4. Accordingly, the first vibration prevention portion 34 may be elastically curved in an upper or lower direction of the yoke 20. The first vibration prevention portion 34 having the cantilever form very effectively suppresses the vibration of the yoke 20 while the yoke 20 rotates relative to the coupling protrusion 32 of the auxiliary lever 30. The first vibration prevention portion 34 may linearly contact the upper surface of the yoke 20. In addition, the auxiliary lever 30 is formed to protrude from the upper surface of the first vibration prevention portion 34 to reinforce the stiffness of the first vibration prevention portion 34, and includes a reinforcing rib extending in the longitudinal direction of the auxiliary lever 30.

The second vibration prevention portion 37 is formed on the outer circumference surface of the coupling protrusion 32. In more detail, the second vibration prevention portion 37 has a form in which the outer circumference surface of the coupling protrusion 32 is formed in a tapered form so that the coupling protrusion 32, which is coupled to the coupling hole 22, is tightly fit (so called "press fit") in a direction in which the coupling protrusion 32 is coupled to the coupling hole 22. As illustrated in FIG. 5, the second vibration prevention portion 37 is formed on the outer circumference surface of the coupling protrusion 32 that is put into the coupling hole 22. That is, the second vibration prevention portion 37 is configured such that the more the coupling protrusion 32 is pressed into the coupling hole 22, the more that the coupling protrusion 32 is tightly fit into the coupling hole 22. Accordingly, the second vibration prevention portion 37 prevents the yoke 20 from vibrating in the width direction of the yoke 20 while the yoke 20 rotates relative to the coupling protrusion 32 of the auxiliary lever 30.

The third vibration prevention portion 38 is disposed in a portion in which the main lever 40 to be described below and the auxiliary lever 30 are coupled to each other. The third vibration prevention portion 38 is intentionally formed so that interference between the main lever 40 and the auxiliary lever 30 occurs in a portion in which the auxiliary lever 30 contacts the main lever 40. The third vibration prevention portion 38 will be described in more detail after describing a structure of the main lever 40.

The main lever 40 includes an assembly protrusion 42 that is coupled to an assembly hole 36 prepared in the auxiliary lever 30. The main lever 40 is formed of synthetic resin. The main lever 40 receives a reciprocating rotatory power from a wiper motor (not shown) due to coupling to a wiper arm (not shown) and rotates a wiper strip (not shown) in a reciprocating motion, thereby wiping foreign substances present on a windshield. FIG. 6 shows a state in which the main lever 40 and the auxiliary lever 30 are coupled to each other. FIG. 7 shows a cross-sectional structure for explaining the third vibration prevention portion 38. Referring to FIG. 7, a structure of the third vibration prevention portion 38 may be understood from a cross section taken along a direction of the width of the main lever 40 in a position where the assembly protrusion 42 and the assembly hole 36 are coupled to each other. The third vibration prevention portion 38 is formed at a contact portion in which one side of the main lever 40 contacts the auxiliary lever 30. The third vibration prevention portion 38 is formed in the auxiliary lever 30 at the contact portion. That is, the third vibration prevention portion 38 is formed on a contact surface in which the auxiliary lever 30 and the main lever 40 contact each other. The third vibration prevention portion 38 is formed in a tapered form so that interference with the main lever 40 occurs. Accordingly, due to the third vibration prevention portion 38, the auxiliary lever 30 presses both sides of the assembly protrusion 42 in a state in which the main lever 40 and the auxiliary lever 30 are coupled to each other so that an unnecessary vibration does not occur in a state in which the assembly protrusion 42 is coupled to the assembly hole 36.

In this manner, in the wiper device for vehicles according to the embodiment of the present invention, the first vibration prevention portion 34 and the second vibration prevention portion 37, which are disposed in the auxiliary lever 30, prevent a vibration of the yoke 20, and the third vibration prevention portion 38 prevents a relative vibration between the main lever 40 and the auxiliary lever 30. Thus, the occurrence of unnecessary vibration in coupling portions between components of the wiper device is suppressed, and thus, a wiper strip smoothly performs a function thereof during wiper operation and the occurrence of noise is suppressed. If the third vibration prevention portion 38 is further included in the wiper device as in the embodiment of the present invention, a relative vibration between the auxiliary lever 30 and the main lever 40 may be even further suppressed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper device for vehicles, comprising:
   a yoke for supporting a wiper strip;
   an auxiliary lever that comprises a coupling protrusion coupled to a coupling hole prepared in the yoke and is formed of synthetic resin; and
   a main lever that comprises an assembly protrusion coupled to an assembly hole prepared in the auxiliary lever and is formed of the synthetic resin,
   wherein the auxiliary lever further comprises:
   a first vibration prevention portion protrusively formed to contact an upper surface of the yoke on a cross section taken along a width direction of the auxiliary lever in a position where the coupling hole is disposed, wherein the first vibration prevention portion extends in a cantilever form and wherein the first vibration prevention portion is elastically curved in an upper or lower direction of the yoke; and
   a second vibration prevention portion in which an outer circumference surface of the coupling protrusion is formed in a tapered form so that the coupling protrusion coupled to the coupling hole is press fit in a direction in which the coupling protrusion is coupled to the coupling hole,
   wherein the auxiliary lever is formed on an upper surface of the first vibration prevention portion to reinforce stiffness of the first vibration prevention portion and comprises a reinforcing rib extending in a longitudinal direction of the auxiliary lever.

2. The wiper device of claim 1, wherein the auxiliary lever further comprises:
   a third vibration prevention portion formed at a contact portion in which one side of the auxiliary lever contacts the main lever, the contact portion being formed on a cross section taken along a width direction of the main lever in a position where the assembly protrusion and the assembly hole are coupled to each other, wherein the third vibration prevention portion is a contact surface formed in the auxiliary lever that is formed in a tapered form so that interference between the auxiliary lever and the main lever occurs.

* * * * *